United States Patent
Lin et al.

(10) Patent No.: US 10,022,668 B2
(45) Date of Patent: Jul. 17, 2018

(54) SELF-REGENERATIVE INTEGRATED DEVICE FOR SYNERGETIC OXIDATION OF LOW-CONCENTRATION GAS AND VENTILATION GAS IN COAL MINE

(71) Applicant: CHINA UNIVERSITY OF MINING AND TECHNOLOGY, Jiangsu (CN)

(72) Inventors: Baiquan Lin, Jiangsu (CN); Qingzhao Li, Jiangsu (CN)

(73) Assignee: CHINA UNIVERSITY OF MINING AND TECHNOLOGY, Jiangsu (CN)

( * ) Notice: Subject to any disclaimer, the term of this patent is extended or adjusted under 35 U.S.C. 154(b) by 178 days.

(21) Appl. No.: 14/898,323

(22) PCT Filed: Nov. 5, 2014

(86) PCT No.: PCT/CN2014/090289
§ 371 (c)(1),
(2) Date: Dec. 14, 2015

(87) PCT Pub. No.: WO2015/074490
PCT Pub. Date: May 28, 2015

(65) Prior Publication Data
US 2016/0136575 A1    May 19, 2016

(30) Foreign Application Priority Data
Nov. 21, 2013  (CN) .......................... 2013 1 0593650

(51) Int. Cl.
*A61L 9/00* (2006.01)
*F23D 14/00* (2006.01)
(Continued)

(52) U.S. Cl.
CPC ............. *B01D 53/86* (2013.01); *B01D 53/44* (2013.01); *E21F 7/00* (2013.01); *B01D 2251/11* (2013.01);
(Continued)

(58) Field of Classification Search
CPC ....... F23G 7/085; B01D 53/1406; C01B 3/52; F23D 14/22
(Continued)

(56) References Cited

U.S. PATENT DOCUMENTS 5,921,763 A       7/1999  Martin
2012/0264068 A1* 10/2012  Hughes ..................... F23G 5/46
                                                              431/2

FOREIGN PATENT DOCUMENTS

CN         101915117 A  * 12/2010  ............... E21F 7/00
CN         101936179 A     1/2011
(Continued)

OTHER PUBLICATIONS

European English Translation of the Description section, the claims section, and the Drawings section of CN 101915117 A.*

*Primary Examiner* — Monzer R Chorbaji
(74) *Attorney, Agent, or Firm* — Saliwanchik, Lloyd & Eisenschenk

(57) ABSTRACT

Disclosed is a self-regenerative integrated device for the synergetic oxidation of low-concentration gas and ventilation gas in a coal mine. The integrated device comprises a metal shell (5). A honeycomb ceramic oxidation bed (13) is arranged within the metal shell (5) and divided into a regenerative section (40) and an oxidation section (41) by a heat exchange chamber (14). A first cavity between the regenerative section (40) and the inner wall of the metal shell (5) is divided into a first inlet chamber (6) and an exhaust chamber (8) by an inlet partition plate (7), a second cavity between the oxidation section (41) and the inner wall of the metal shell (5) is divided into a second inlet chamber (22) and a mixing chamber (20) by a partition plate (21) for averaging gas, and a plurality of gas nozzles (28) are provided on the partition plate (21) for averaging gas. An internal heat exchanger (35) is arranged within the heat
(Continued)

exchange chamber (14), and a heat exchanger inlet (16) and a heat exchanger outlet (15) of the internal heat exchanger (35) are respectively connected with a boiler drum (18). The first inlet chamber (6) is connected with an inlet (1) of the ventilation gas through a proportional control valve (38), the second inlet chamber (22) is connected with an inlet (31) for extracting the low-concentration gas through a proportional mixer (33), and the proportional control valve (38) is connected with the proportional mixer (33) through a connecting pipeline (36). The two ends of an inlet preheating pipe (9) on the honeycomb ceramic oxidation bed (13) are respectively communicated with the first inlet chamber (6) and the mixing chamber (20).

5 Claims, 2 Drawing Sheets

(51) Int. Cl.
  *B01D 53/86* (2006.01)
  *E21F 7/00* (2006.01)
  *B01D 53/44* (2006.01)

(52) U.S. Cl.
  CPC ............... *B01D 2255/2073* (2013.01); *B01D 2255/2092* (2013.01); *B01D 2255/20715* (2013.01); *B01D 2255/20738* (2013.01); *B01D 2258/06* (2013.01)

(58) Field of Classification Search
  USPC ............ 422/306–307; 431/5, 7; 96/108, 242
  See application file for complete search history.

(56) References Cited

FOREIGN PATENT DOCUMENTS

| | | |
|---|---|---|
| CN | 102011605 A | 4/2011 |
| CN | 203271799 U | 11/2013 |
| CN | 103643986 A | 3/2014 |

\* cited by examiner

SELF-REGENERATIVE INTEGRATED DEVICE FOR SYNERGETIC OXIDATION OF LOW-CONCENTRATION GAS AND VENTILATION GAS IN COAL MINE

CROSS REFERENCE TO A RELATED APPLICATION

This application is a National Stage Application of International Application Number PCT/CN2014/090289, filed Nov. 5, 2014; which claims priority to Chinese Patent Application No. 201310593650.7, filed Nov. 21, 2013; both of which are incorporated herein by reference in their entirety.

TECHNICAL FIELD

The present invention relates to a self-regenerative integrated device for synergetic oxidation of low-concentration gas and ventilation gas in a coal mine, which is a mining equipment for synergetic oxidation on the basis of a heat storage and regenerative principle and is utilized for extraction of low-concentration gas and ventilation gas in coal mines. The present invention belongs to the field of energy conservation and emission reduction, safety technology and engineering in coal mines.

BACKGROUND ART

China has rich coal mine gas (coal bed gas) resource, and the occurrence of gas (coal bed gas) resource within the range of 2,000 m underground is approx. 30~35 trillion $m^3$. Effective exploitation and utilization of coal and gas resources is increasingly important in the development of national economy in China. Coal mine gas is a clean, efficient, and non-renewable energy source, with heat value as high as 33.5~36.8 $MJ/m^3$. The heat value of 1 $m^3$ gas is equivalent to that of 1.3 kg standard coal. In addition, no harmful substance, such as nitrogen oxides and sulfides, etc., is produced in the utilization process of coal mine gas. More than 50% coal beds in China are coal beds with high gas content. In 2009, the total volume of coal mine gas released in the production in coal mines in China exceeds 15 billion $m^3$. However, almost ⅔ coal mine gas is directly emitted into the atmosphere in the form of ventilation, causing severe waste of the precious energy resource and pollution to the atmospheric environment. Moreover, since the greenhouse effect of coal mine gas (coal bed gas) is 21 times of that of carbon dioxide, the resultant damage to the ozone layer is 7 times of that produced by $CO_2$. At present, in the international carbon sequestration market, the carbon emission reduction can be sold for RMB85 Yuan per ton. An income of RMB 17 billion Yuan can be obtained per year due to the emission reduction and utilization of 15 billion $m^3$ gas. Hence, by utilizing coal-mine gas (including ventilation gas) as a resource, not only direct economic benefits can be obtained in the aspect of gas utilization, but also rich returns can be obtained in the aspect of energy conservation and emission reduction.

At present, the low-concentration gas extracted from a coal mine is mainly used for electric power generation in an gas-internal combustion power generator set, but the concentration of the gas usually must be not lower than 6%; whereas low-concentration gas at 1%~6% extracted from a coal mine usually is emitted directly. For treatment of the ventilation gas in a coal mine, available industrialization techniques include thermal countercurrent oxidation technique and catalyzed countercurrent oxidation technique. However, it is proved in field application that the surface heat dissipation and oxidation reaction on an oxidizing bed can be maintained stably by the heat release part of the gas oxidation reaction only if the concentration of the ventilation gas is higher than 0.5%. In addition, both the thermal countercurrent oxidation technique and the catalyzed countercurrent oxidation technique for treatment of ventilation gas utilize a heat storage oxidation principle in a "reciprocating flow mode". With the gas flow reciprocating in the oxidation device, the temperature field in the device is always in a state of fluctuation, consequently, on one hand, the vapor parameters of the heat extracting device will fluctuate, and bring a severe impact on safe operation of the steam turbine set; on the other hand, the fluctuating temperature field in a reciprocating flow mode makes the regenerator always in a heat and cold alternating state, which also has a severe impact on the mechanical strength and service life of the regenerator.

CONTENTS OF INVENTION

The object of the present invention is to overcome the drawbacks in the prior art and provide an integrated device for realizing synergetic oxidation of low-concentration gas and ventilation gas in a coal mine, which employs advanced principle, simple and reliable equipment, compact and reasonable structure, and can achieve a remarkable effect of energy conservation and emission reduction.

To attain the object described above, the present invention employs the following technical scheme:

The present invention discloses a self-regenerative integrated device for synergetic oxidation of low-concentration gas and ventilation gas in a coal mine, comprising a metal shell, wherein, a heat insulating layer is arranged on the outer wall of the metal shell, a honeycomb ceramic oxidation bed is arranged in the metal shell and divided into a regenerative section and an oxidation section by a heat exchange chamber, a first cavity is formed between the regenerative section and the inner wall of the metal shell, a second cavity is formed between the oxidation section and the inner wall of the metal shell, the first cavity is divided into a first gas intake chamber and an exhaust chamber by an gas intake partition plate, and the second cavity is divided into a second gas intake chamber and a mixing chamber by a partition plate for averaging gas, a plurality of gas spray nozzles are arranged on the partition plate for averaging gas; an internal heat exchanger is arranged in the heat exchange chamber and has a heat exchanger inlet and a heat exchanger outlet, and the heat exchanger inlet and the heat exchanger outlet are respectively connected with a boiler drum; a water supply inlet and a vapor outlet are arranged on the boiler drum, the first gas intake chamber has a first gas inlet, and the first gas inlet is connected with a proportional regulating valve through a first connecting flange; the second gas intake chamber has a second gas inlet, and the second gas inlet is connected with a proportioning mixer through a fourth connecting flange, a ventilation gas inlet is connected with the proportional regulating valve through a second connecting flange, a low-concentration gas extracting inlet is connected with the proportioning mixer through a sixth flange, one end of a connecting pipeline is connected with the proportional regulating valve through a third flange, and the other end of the connecting pipeline is connected with the proportioning mixer through a fifth flange; the exhaust chamber has an exhaust outlet, an exhaust pipeline is connected with the exhaust outlet through a seventh flange, a high temperature flue gas inlet is arranged in the second gas intake chamber with a high temperature flue gas valve arranged in the high temperature flue gas inlet, the high temperature flue gas valve is connected with a startup burner, and a startup burner fan and a startup fuel ejection pump are mounted on the startup burner; a plurality of intake gas preheating pipes are arranged on the honeycomb ceramic oxidation bed, one end of the intake gas preheating pipe passes across the gas intake partition plate and communicates with the first gas intake chamber, and the other end of the intake gas preheating pipe communicates with the mixing chamber.

In the present invention, furthermore, the intake gas preheating pipes are in a staggered arrangement.

In the present invention, furthermore, the gas spray nozzles are in the same quantity as the intake gas preheating pipes, and the mounting positions of the gas spray nozzles on the partition plate for averaging gas are in one-to-one correspondence to the mounting positions of the intake gas preheating pipes on the honeycomb ceramic oxidation bed.

In the present invention, furthermore, the material of the honeycomb ceramic oxidation bed is aluminum oxide, silicon carbide, zirconium dioxide, praguite or cordierite; the meshes of the honeycomb ceramic oxidation bed are in square, rectangular, orthohexagonal, circular, or triangular shape.

In the present invention, furthermore, the internal heat exchanger is in a serpentine tube structure.

Beneficial Effects:

1) The ventilation gas is preheated by regenerative and then entered into the mixing chamber, mixed with the extracted low-concentration gas sprayed by the gas spray nozzles, and then the gas mixture is entered into the honeycomb ceramic oxidation bed; thus, the ventilation gas and extracted low-concentration gas are oxidized synergistically and integrally;
2) With the arrangement of a regenerative section in the honeycomb ceramic oxidation bed, the heat recovery is improved effectively, and the heat can also be used for gas-contained gas preheating in the intake gas preheating pipe; thus, the device can be operated in a self-regenerative mode;
3) The device employs a regenerative oxidation operating mode in which the gas flow in one way, and thereby effectively avoids continuous fluctuation of the temperature field in the oxidation device and operating instability in the conventional reciprocating flow mode, and effectively avoids thermal stress damage to the honeycomb ceramic oxidation bed incurred by temperature cycling owing to reciprocating flow;
4) The internal heat exchanger employs a plurality of low-capacity sets, which are arranged together in the heat exchange chamber for extracting heat; such an arrangement is beneficial for central management and replacement of the internal heat exchanger and stability of the vapor parameters;
5) Since the intake gas preheating pipes are arranged in a staggered arrangement in the honeycomb ceramic oxidation bed, the regenerative effect is guaranteed, and the structure is compact and reasonable;
6) An external startup burner is utilized for startup of the device, and the honeycomb ceramic oxidation bed is preheated by the high temperature flue gas produced by the startup burner in the startup process; thus, the startup and operation is easy and convenient, and the maintenance and management of the startup system is easy.

Among the figures: 1—ventilation gas inlet, 2—first connecting flange, 3—first gas inlet, 4—heat insulating layer, 5—metal shell, 6—first gas intake chamber, 7—gas intake partition plate, 8—exhaust chamber, 9—intake gas preheating pipe, 10—seventh connecting flange, 11—exhaust pipeline, 12—exhaust outlet, 13—honeycomb ceramic oxidation bed, 14—heat exchange chamber, 15—heat exchanger outlet, 16—heat exchanger inlet, 17—vapor outlet, 18—boiler drum, 19—water supply inlet, 20—mixing chamber, 21—partition plate for averaging gas, 22—second gas intake chamber, 23—high temperature flue gas inlet, 24—startup burner fan, 25—startup fuel ejection pump, 26—startup burner, 27—high temperature flue gas valve, 28—gas spray nozzle, 29—gas inlet, 30—fourth connecting flange, 31—low-concentration gas extracting inlet, 32—sixth connecting flange, 33—proportional mixer, 34—fifth connecting flange, 35—internal heat exchanger, 36—connecting pipeline, 37—third connecting flange, 38—proportional regulating valve, 39—second connecting flange, 40—regenerative section, 41—oxidation section.

DETAILED DESCRIPTION OF THE EMBODIMENTS

Hereunder the present invention will be further detailed, with reference to the accompanying drawings.

Figure 1:
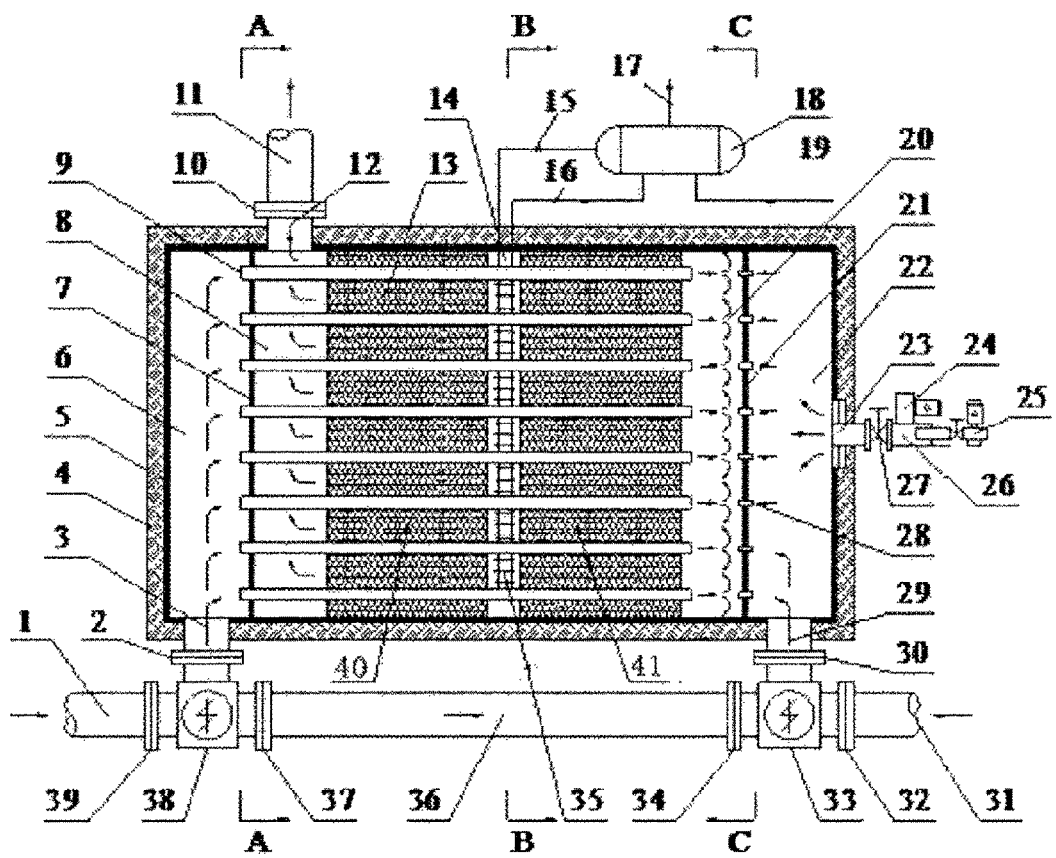
FIG. 1 is a front sectional view of the structure in the present invention.
Figure 2:
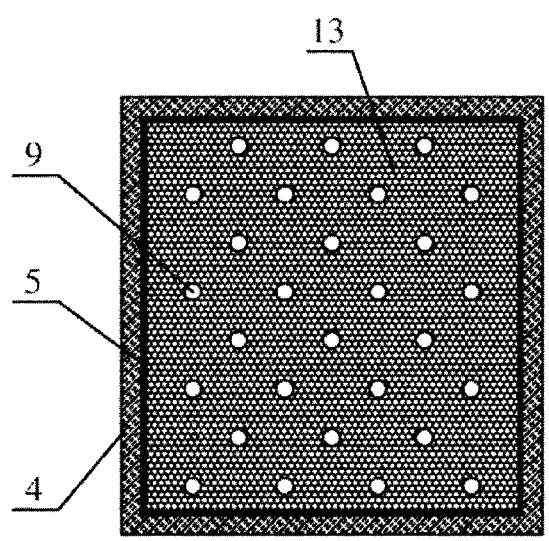
FIG. 2 is a sectional view A-A of the structure shown in FIG. 1.
Figure 3:
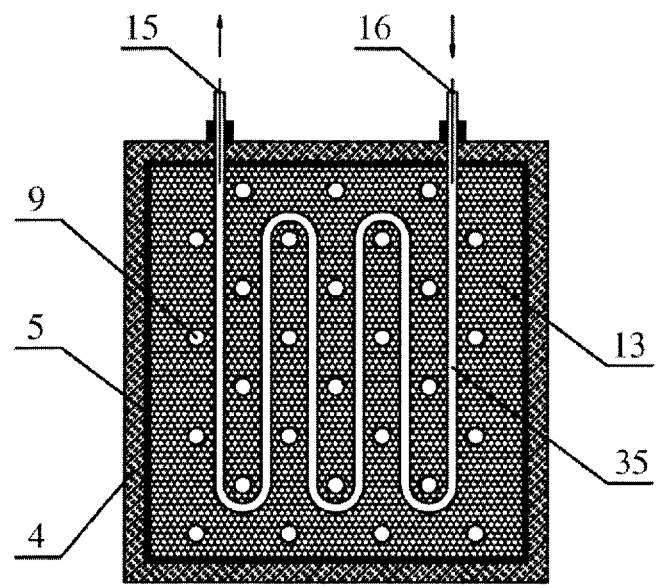
FIG. 3 is a sectional view B-B of the structure shown in FIG. 1.
Figure 4:
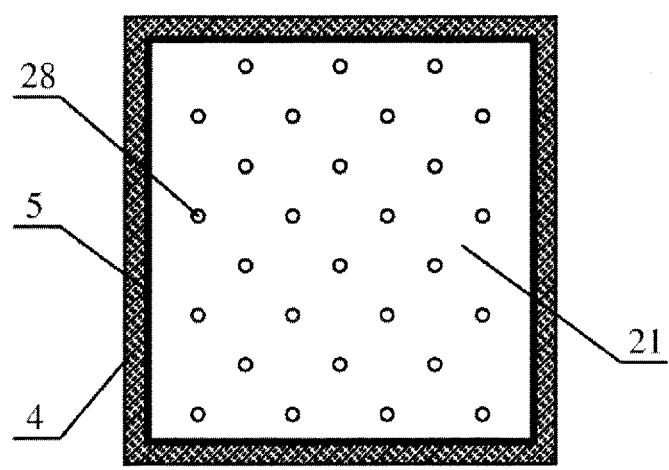
FIG. 4 is a sectional view C-C of the structure shown in FIG. 1.

As shown in FIGS. 1-4, the self-regenerative integrated device for synergetic oxidation of low-concentration gas and ventilation gas in a coal mine disclosed in the present invention comprises a metal shell 5, with a heat insulating layer 4 arranged on the outer wall of the metal shell 5 and a honeycomb ceramic oxidation bed 13 arranged in the metal shell 5. The material of the honeycomb ceramic oxidation bed 13 can be aluminum oxide ($Al_2O_3$), silicon carbide (SiC), zirconium dioxide ($ZrO_2$), praguite, or cordierite; the meshes of the honeycomb ceramic oxidation bed 13 can be square, rectangular, orthohexagonal, circular, or triangular shape. The honeycomb ceramic oxidation bed 13 is divided into a regenerative section 40 and an oxidation section 41 through a heat exchange chamber 14, a first cavity is formed between the regenerative section 40 and the inner wall of the metal shell 5, a second cavity is formed between the oxidation section 41 and the inner wall of the metal shell 5, the first cavity is divided into a first gas intake chamber 6 and an exhaust chamber 8 by a gas intake partition plate 7, the second cavity is divided into a second gas intake chamber 22 and a mixing chamber 20 by a partition plate for averaging gas 21, and a plurality of gas spray nozzles 28 are arranged on the partition plate for averaging gas 21. An internal heat exchanger 35 is arranged in the heat exchange chamber 14, the internal heat exchanger 35 is in a serpentine tube structure, a heat exchanger inlet 16 and a heat exchanger outlet 15 are arranged in the two ends of the internal heat exchanger 35, and the heat exchanger inlet 16 and the heat exchanger outlet 15 are connected with a boiler drum 18 respectively; a water supply inlet 19 and a vapor outlet 17 are arranged on the boiler drum 18. The first gas intake chamber 6 has a first gas inlet 3, which is connected with a proportional regulating valve 38 through a first connecting flange 2; the second gas intake chamber 22 has a second gas inlet 29, which is connected with a proportioning mixer 33 through a fourth connecting flange 30; the ventilation gas inlet 1 is connected with the proportional regulating valve 38 through a second connecting flange 39; a low-concentration gas extracting inlet 31 is connected with the proportioning mixer 33 through a sixth flange 32; one end of a connecting pipeline 36 is connected with the proportional regulating valve 38 through a third flange 37, and the other end of the connecting pipeline 36 is connected with the proportioning mixer 33 through a fifth flange 34; the exhaust chamber 8 has an exhaust outlet 12, an exhaust pipeline 11 is connected with the exhaust outlet 12 through a seventh flange 10; the second gas intake chamber 22 has a high temperature flue gas inlet 23, and a high temperature flue gas valve 27 is arranged in the high temperature flue gas inlet 23 and is connected with a startup burner 26, a startup burner fan 24 and a startup fuel ejection pump 25 are mounted on the startup burner 26. A plurality of intake gas preheating pipes 9 are arranged on the honeycomb ceramic oxidation bed 13, one end of the intake gas preheating pipe 9 passes across the gas intake partition plate 7 and communicates with the first gas intake chamber 6, and the other end of the intake gas preheating pipe 9 communicates with the mixing chamber 20. In this embodiment, the intake gas preheating pipes 9 are in a staggered arrangement, i.e., any two rows of intake gas preheating pipes 9 are staggered from each other in transverse direction, and any two columns of intake gas preheating pipes 9 are staggered from each other in longitudinal direction; the gas spray nozzles 28 are in the same quantity as the intake gas preheating pipes 9, and the mounting positions of the gas spray nozzles 28 on the partition plate for averaging gas 21 are in one-to-one correspondence to the mounting positions of the intake gas preheating pipes 9 on the honeycomb ceramic oxidation bed 13.

The operating process of the device provided in the present invention is as follows: the startup burner 26 is started, the startup burner fan 24 and the fuel ejection pump 25 are started to lead air and fuel respectively into the startup burner 26, where the air and fuel are mixed with each other and combusted; the high temperature flue gas produced during the combustion passes through the high temperature flue gas valve 27, the second gas intake chamber, the gas spray nozzles 28, and the mixing chamber 20 sequentially and enters into the intake gas preheating pipes 9; the heat is conducted from the intake gas preheating pipes 9 to the honeycomb ceramic oxidation bed 13, so that the honeycomb ceramic oxidation bed 13 is preheated to about 1,000° C., and then the startup burner 26 is shut down; the ventilation gas and extracted low-concentration gas enter into the system through the ventilation gas inlet 1 and the low-concentration gas extracting inlet 31 respectively; the opening degree of the proportional regulating valve 38 is adjusted according to the concentration of the ventilation gas, to control the flow ratio of the ventilation gas in the first gas inlet 3 and the connecting pipeline 36; at the same time, the opening degree of the proportioning mixer 33 is adjusted according to the concentration of the extracted low-concentration gas; the proportioning mixer 33 is used to mix the ventilation gas with the extracted low-concentration gas at a specific mix ratio, to increase the gas concentration in the gas mixture, and enhance the operating stability of the oxidation device and the economic efficiency of heat utilization; the ventilation gas in the first gas intake chamber 6 is mixed with the extracted low-concentration gas sprayed by the gas spray nozzles 28 in the mixing chamber 20 after it is preheated in the intake gas preheating pipe 9, and the gas mixture enters into the oxidation section 41 of the honeycomb ceramic oxidation bed 13 for a regenerative oxidation reaction; the high temperature flue gas produced in the regenerative oxidation reaction passes through the internal heat exchanger 35 first for heat extraction, and then enters into the regenerative section 40 of the honeycomb ceramic oxidation bed 13 for further heat recovery; finally, the flue gas at a reduced temperature is exhausted from the exhaust chamber 8 through the exhaust outlet 12 and exhaust pipeline 11.

The heat extraction process in the internal heat exchanger 35 is as follows: circulating water for heat extraction is fed through the water supply inlet 19 into the boiler drum 18 first; driven by the density difference between the vapor and the circulating water, the circulating water enters into the internal heat exchanger 35 through the heat exchanger inlet 16 for heat extraction; next, the circulating water enters into the boiler drum through the heat exchanger outlet 15 for water-vapor separation, and the resultant vapor is exhausted through the vapor outlet 17 to a heat utilization spot.

While the present invention has been illustrated and described with reference to some preferred embodiments, and the present invention is not limited to these. Those skilled in the art should recognize that various variations and modifications can be made without departing from the spirit and scope of the present invention. All of such variations and modifications shall be deemed as falling into the protected scope of the present invention.

The invention claimed is:

1. A self-regenerative integrated device for synergetic oxidation of low-concentration gas and ventilation gas in a coal mine, characterized by comprising a metal shell, with a heat insulating layer arranged on the outer wall of the metal shell and a honeycomb ceramic oxidation bed arranged in the metal shell, wherein, the honeycomb ceramic oxidation bed is divided into a regenerative section and an oxidation section by a heat exchange chamber, a first cavity is formed between the regenerative section and the inner wall of the metal shell, a second cavity is formed between the oxidation section and the inner wall of the metal shell, the first cavity is divided into a first gas intake chamber and an exhaust chamber by a gas intake partition plate, the second cavity is divided into a second gas intake chamber and a mixing chamber by a partition plate for averaging gas, and a plurality of gas spray nozzles are arranged on the partition plate for averaging gas; an internal heat exchanger is arranged in the heat exchange chamber and has a heat exchanger inlet and a heat exchanger outlet, and the heat exchanger inlet and the heat exchanger outlet are connected with a boiler drum respectively, a water supply inlet and a vapor outlet are arranged on the boiler drum, the first gas intake chamber has a first gas inlet, which is connected with a proportional regulating valve through a first connecting flange; the second gas intake chamber has a second gas inlet, which is connected with a proportioning mixer through a fourth connecting flange; a ventilation gas inlet is connected with the proportional regulating valve through a second connecting flange; a low-concentration gas extracting inlet is connected with the proportioning mixer through a sixth flange; one end of a connecting pipeline is connected with the proportional regulating valve through a third flange, and the other end of the connecting pipeline is connected with the proportioning mixer through a fifth flange; the exhaust chamber has an exhaust outlet, and an exhaust pipeline is connected with the exhaust outlet through a seventh flange; a high temperature flue gas inlet directly connected to the second gas intake chamber, and a high temperature flue gas valve is arranged in the high temperature flue gas inlet, the high temperature flue gas valve is connected with a startup burner, a startup burner fan and a startup fuel ejection pump are mounted on the startup burner; a plurality of intake gas preheating pipes are arranged on the honeycomb ceramic oxidation bed, one end of the intake gas preheating pipe passes across the gas intake partition plate and extends to the first gas intake chamber, and the other end of the intake gas preheating pipe extends to the mixing chamber.

2. The self-regenerative integrated device for synergetic oxidation of low-concentration gas and ventilation gas in a coal mine according to claim 1, characterized in that the intake gas preheating pipes are in a staggered arrangement.

3. The self-regenerative integrated device for synergetic oxidation of low-concentration gas and ventilation gas in a coal mine according to claim 1, characterized in that the gas spray nozzles are in the same quantity as the intake gas preheating pipes, and the mounting positions of the gas spray nozzles on the partition plate for averaging gas are in one-to-one correspondence to the mounting positions of the intake gas preheating pipes on the honeycomb ceramic oxidation bed.

4. The self-regenerative integrated device for synergetic oxidation of low-concentration gas and ventilation gas in a coal mine according to claim 1, characterized in that the material of the honeycomb ceramic oxidation bed is aluminum oxide, silicon carbide, zirconium dioxide, praguite, or cordierite; and the meshes of the honeycomb ceramic oxidation bed are in square, rectangular, orthohexagonal, circular, or triangular shape.

5. The self-regenerative integrated device for synergetic oxidation of low-concentration gas and ventilation gas in a coal mine according to claim 1, characterized in that the internal heat exchanger is in a serpentine tube structure.

* * * * *